Aug. 22, 1933.   J. B. HENDERSON   1,924,037
GYROSCOPIC NAVIGATIONAL INSTRUMENT
Filed April 27, 1929   4 Sheets-Sheet 1

INVENTOR
JAMES B. HENDERSON
BY
ATTORNEYS

INVENTOR
JAMES B. HENDERSON
BY
ATTORNEYS

INVENTOR
JAMES B. HENDERSON
BY Blair & Kilgore
ATTORNEYS

Patented Aug. 22, 1933

1,924,037

UNITED STATES PATENT OFFICE 1,924,037

GYROSCOPIC NAVIGATIONAL INSTRUMENT

James Blacklock Henderson, Blackheath, England

Application April 27, 1929, Serial No. 358,551, and in Great Britain May 9, 1928

11 Claims. (Cl. 33—204)

My invention relates to gyroscopic navigational instruments of the constrained gyroscope or turn indicator type and has for its object the provision of indications of the angular movements of the craft in relation to a fixed axis or axes instead of, as heretofore, an axis or axes moving angularly with the craft. Another object of my invention is to increase the utility of the instrument by increasing the number of different indications to be obtained from a single instrument.

When an aircraft turns in azimuth, the wings may be banked and when they are in the correct banking angle the deck of the plane is at right angles to the vertual vertical. That is to say, if the plane is correctly banked a bubble-tube level mounted athwartships on the plane will appear to show that the deck is horizontal although in fact it is inclined to the true horizontal plane. A pendulum will provide a similarly fallacious indication by seeking the virtual vertical. When flying in clouds, therefore, the pilot has no indication that he is banking or of his actual banking angle, since the only indication which he can obtain from bubble-tube or pendulum is the difference, if any, between the actual banking angle at the moment and the unknown angle of tilt of the virtual horizontal. The card of his magnetic compass also slowly follows the virtual horizontal plane, so that when the plane is banked the card is tilted, and the magnetic dip, acting in the true vertical direction, causes the card to deviate from the meridian, so that when banking the compass is unreliable and navigation becomes more difficult.

The object of my invention is to provide the pilot with an instrument to indicate the banking angle and to take the place of the compass when banking, an instrument which will not only indicate to him that he is turning but will give him the rate of turning in azimuth, the angle through which he has turned in azimuth, the banking angle of the plane, the true vertical in the athwartships plane and a steering pointer to facilitate the maintainance of a straight course by moving the tiller in phase with the motion of the steering pointer.

By means of this instrument the pilot, when flying through clouds, will know whether he is banking or not and the amount of the banking. When the banking is zero he will be able to rely more confidently on his magnetic compass. For squadron flying the instrument will enable the pilot to turn in azimuth through a certain angle to a new course, which he cannot do at present since the compass is unreliable when banked.

The banking angle indicator should also be useful in squadron flying and the true vertical indicator should be useful for many purposes, such as spotting from aircraft and controlling other apparatus which require the true vertical as a datum. In trying to steer a straight course, if the rudder is moved in phase with the deviation from the course, or in phase with the angular velocity of turning, a sinuous course results; the straightest course is effected by a motion of the rudder in phase with a combination of the deviation and the angular velocity, and this combination is indicated by a steering pointer on my instrument, which is preferably associated with a follower pointer actuated by the tiller so that the pilot has only to keep the two pointers in line in order to steer a straight course with minimum deviations from it.

My invention comprises a constrained gyroscope, preferably of the type described in my U. S. Patent 1,831,597 granted November 10, 1931, fixed to the plane, preferably with the gyro trunnions parallel to the deck and athwartships and the rotor axis horizontal and fore-and-aft, so that the torque on the gyro measures the rate of turning, not about the true vertical, but about an axis perpendicular to the deck, or about the virtual vertical when the plane is correctly banked. The manner of using this torque measurement in my instrument is most easily explained by mathematical symbols, as follows:—

Let $\theta$ denote the angular displacement in azimuth, $\dot{\theta}$ the angular velocity in azimuth, $\omega$ the angular velocity about the virtual vertical, R the radius of the turn in azimuth, V the speed of the plane, $\alpha$ the banking angle, I the moment of inertia of the gyroscope rotor, $\Omega$ the angular velocity of the gyroscope rotor, T the spring couple constraining the gyroscope, $g$ the acceleration of gravity, and K a constant.

Then $\dot{\theta} = \omega \sec \alpha$;

$$\tan \alpha = \frac{V^2}{Rg} = \frac{V\dot{\theta}'}{g}$$

and $T = I\Omega\omega$ $$\sin \alpha = \frac{V\omega}{g} = \frac{V}{g} \times \frac{T}{I\Omega}$$

or, Sin $\alpha$ is proportional to T, if V and $\Omega$ are constant, or if $\Omega = KV$.

If the gyroscope is driven by an airscrew the condition $\Omega = KV$ is realised and the proportionality between Sin $\alpha$ and T is unaffected by changes in the speed of the plane.

I therefore arrange to apply the spring couple T by means of a swinging arm or arms, moving through an angle $\alpha$ such that $$\sin \alpha = \frac{T}{K_{g}I}$$

and, incidentally, by communicating this movement to a pointer, I provide an indication of the true vertical so long as the plane is properly banked. From the angle $\alpha$ I obtain Tan$\alpha$ by means of a tangent mechanism, and since $$\tan \alpha = \frac{V\dot\theta}{g}$$

this serves as a datum for the integration of $\dot\theta$ to obtain $\theta$. In order to carry out this integration I use an integrator of the variable-speed friction disc type with special arrangements to provide for variation of V. Two alternative methods are described. In the first and preferred the driving disc, instead of running at constant speed, is driven by the airscrew through a governor-actuated variable-speed friction drive, at a speed which varies inversely as the speed of the plane, so that automatic compensation for variations in the speed of the plane is realized. In the second, the driving disc is driven at constant speed by means of a clockwork motor or otherwise, and variations in the speed of the plane are compensated by means of a hand adjustment for V.

The instrument may be conveniently constructed in two parts, one being the gyro instrument with its airscrew, fixed outside the fuselage of the plane, and the other consisting of a dial instrument in front of the pilot, the two parts being connected by a flexible shaft or shafts as required.

The dial instrument comprises five dials and seven pointers, two of the dials having two pointers each. Actually in the drawings I show only six pointers, one being omitted for reasons stated later. The seven pointers indicate respectively 1. Compass bearing of actual course,
2. Deviation from set course, or $\theta$.
3. Set course. This pointer is set by hand.
4. Banking angle, $\alpha$.
5. Rate of turning in azimuth, or $\theta'$.
6. Steering indication, $\theta + \alpha\theta'$, $\alpha$ being a constant,
7. Rudder indicator, being a follower pointer to No. 6 actuated by the rudder. In the drawings this pointer is omitted.

The method of actuating these several pointers and the construction of the instrument generally will be better understood from the attached drawings and the following detailed description. As regards the drawings.

Figure 1:
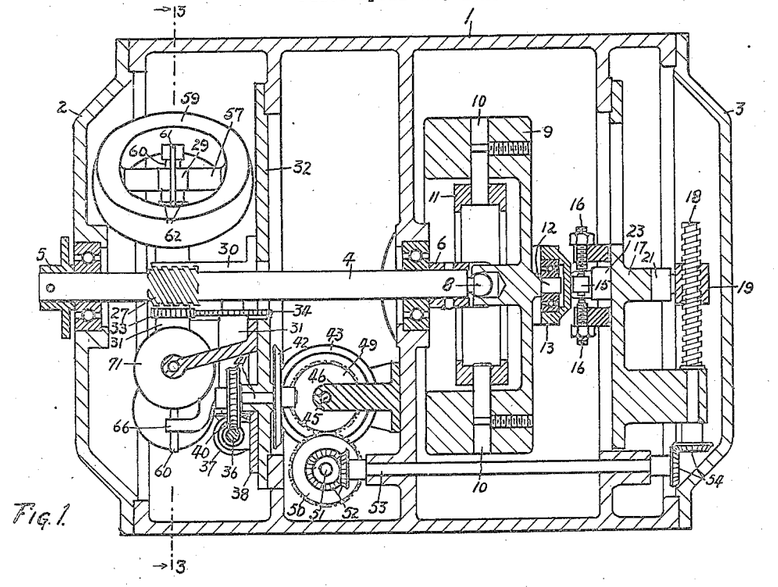
Fig. 1 is a part-sectional elevation of the gyro instrument, looking at right angles to the rotor axis of the gyroscope.
Figure 2:
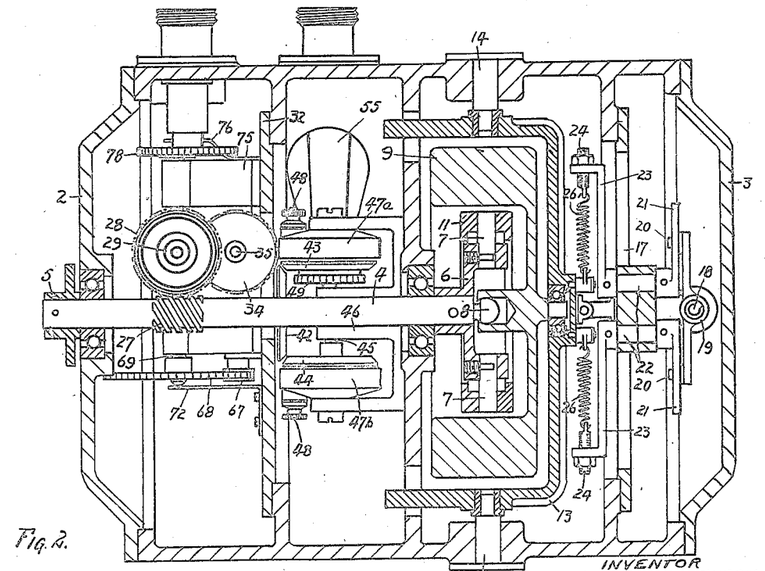
Fig. 2 is a part-sectional plan of the gyro instrument.
Figures 3, 4:
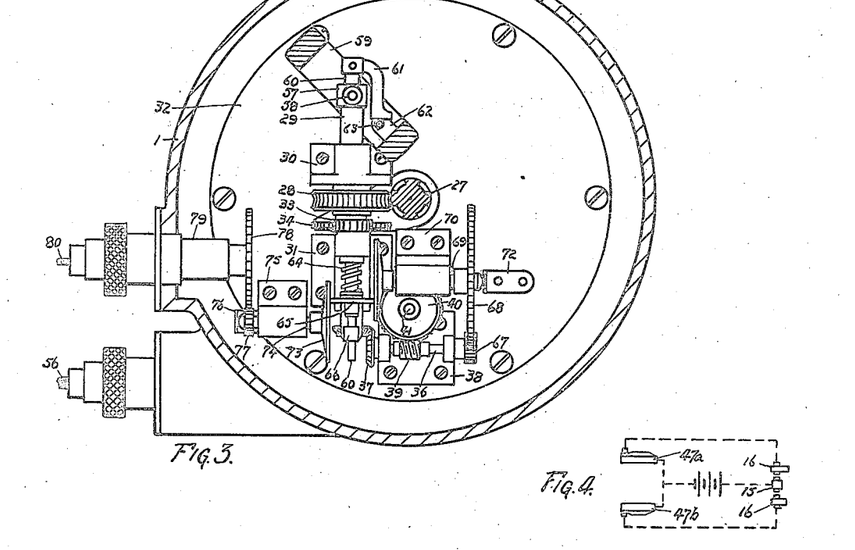
Fig. 3 is a cross section of the gyro instrument on the line 3—3 of Fig. 1.
Fig. 4 is a diagram showing the electrical connections.

Referring first to Figs. 1, 2 and 3, the casing of the gyro instrument consists of a cylindrical casting 1 and two end covers 2 and 3. The driving shaft 4 is supported in ball bearings in the end cover 2 and in the main casting 1 and carries at its outer end the boss 5 to which the airscrew (not shown) is attached, and at its inner end the gyro rotor 9 on a universal joint consisting of a fork 6 carrying the pins 7, the axis of which passes through the centre of the ball 8 turned on the end of the shaft 4. The ball 8 fits easily but without play in a cylindrical socket in the rotor 9, which also carries two pins 10 the axis of which passes through the centre of the ball. The two pairs of pins, 7 and 10, are at right angles to each other and to the axis of the driving shaft 4 in their normal position, and are connected by the gimbal ring 11 which forms the intermediate member of the universal joint. The rotor 9 is constrained by a short spindle 12 in line with its axis which carries a ball-bearing fitting into a housing in the fork 13. This fork is pivoted on pins 14 fixed to the casing 1, the axis of the pins 14 passing through the centre of the ball 8. The fork 13 with its attachments is balanced on the pins 14, and the rotor 9 is balanced on the ball 8. Fixed to the fork 13 is an insulated contact 15 which, on the slightest tilt of the rotor 9, meets one or other of two adjustable insulated contacts 16 fixed to the spider 17 which is fixed to the casing 1. Turning of the aeroplane produces a precession of the rotor 9 about the axis of the pins 14 and causes the insulated contact 15 to press on one or other of the contacts 16. In order to measure the rate of turning it is necessary to measure the couple about the axis of the pins 14 which is required to separate the contacts 15 and 16.

To apply this couple the screw shaft 18, pivoted in a vertical bearing in the spider 17, carries a cross-head nut 19 to which are fixed two pins 20 engaging in slots in the normally horizontal cranks 21 fixed to shafts 22 which are pivoted in the spider 17. Fixed to the other ends of the shafts 22 are cranks 23, also normally horizontal, carrying at their outer ends the adjustment screws 24. Fixed to the fork 13 and in the plane through the pivots 12 and 14, are two pins 25 on which are pivoted shackles for attachment of the coil springs 26, the other ends of the springs being attached to the adjustment screws 24. It will be seen that rotation of the screw shaft 18 tilts the springs 26 and produces a couple about the trunnions 14 proportional to the Sine of the angle of tilt of the springs. Denoting this angle of tilt by $\alpha$ and the couple by T, it has been shown that if $$\sin \alpha = \frac{T}{K_g I}$$

and if T is the couple required to overcome the pressure between the contacts 15 and 16, then $\alpha$ is the banking angle provided the plane is properly banked. All that is required therefore to make the angle $\alpha$ equal to the banking angle is to adjust the pull of the springs 26 by means of the adjustment screws 24 so as to make Sin $\alpha$ equal to $$\frac{T}{K_g I}$$

It will be seen also that the rotation of the screw shaft 18 is proportional to Tan $\alpha$, and therefore proportional to $V\dot\theta$.

Turning now to the mechanism for operating the screw shaft 18 automatically, the worm 27 cut on the driving shaft 4 engages with the worm wheel 28 fixed to the sleeve 29, which is pivoted in bearings in the brackets 30 and 31 fixed to the disc 32. The pinion 33, also fixed to the sleeve 29, meshes with the spur wheel 34 fixed to the vertical spindle 35, which is pivoted in the bracket 31 and conveys the motion to the horizontal spindle 36 through the mitres 37. This spindle 36, which is pivoted in bearings in the bracket 38 fixed to the disc 32 carries a worm 39 which meshes with a worm wheel 40 fixed to a spindle 41 pivoted in a boss on the disc 32 (see Fig. 1). A friction mitre 42 is fixed to the other end of the spindle 41 and two similar mitres, 43 and 44, are fixed to the spindle 45 which is pivoted in a bracket 46 on the casing 1. The mitres 43 and 44 form the armatures of two pot magnets 47a and 47b which are fixed to the bracket 46, but the mitres are prevented by the mitre 42 from coming actually into contact with their respective magnets. Either of the mitres 43 and 44 can therefore be brought into contact with the mitre 42 by energising one or other of the two magnets. The terminals 48 on the magnets are connected to the two insulated contacts 16 in circuit with a battery outside the instrument as shown diagrammatically in Fig. 4, so that one or other of the magnets is energized by the upward or downward tilt of the gyro according as the plane turns to left or right. The direction of rotation of the spindle 45 is thus determined by the direction in which the plane is turning, and its rotation is conveyed to the screw shaft 18 through the spur wheel 49 fixed to the friction mitre 43, the spur wheel 50 fixed to the spindle 51, the mitres 52, the spindle 53 pivoted in bearings in the casing 1, and the mitres 54. The spindle 51, pivoted in the long boss 55, conveys the motion to the flexible shaft 56 and so transmits to the dial instrument a movement proportional to Tan $\alpha$ or to $V\dot\theta$.

Referring now to the governor-controlled variable speed drive which is required if compensation for variation in speed of the plane, required for accurate integration of $\dot\theta$, is to be made automatically, it will be seen that the sleeve 29 carrying worm wheel 28 and pinion 33 also carries at its upper end a crosshead 57 (Fig. 3) on which the governor flywheel 59 is pivoted by the trunnions 58. The plunger 60, which slides in the sleeve 29, carries at its top end the arm 61 which engages between the lugs 62 on the flywheel and is held against the roller 63, pivoted in these lugs, by the spring 64. The lower end of the plunger 60 is reduced in diameter and serves as a pivot for the friction wheel 65 which it displaces axially under the influence of the governor 59. Additional guidance for the plunger 60, to resist the side thrust of the friction wheel 65, is provided by the guide 66 on the bracket 31. A pinion 67 fixed to the spindle 36 meshes with a spur wheel 68 fixed to the spindle 69, which is pivoted in the bracket 70 on the disc 32, and the friction disc 71 on the other end of the spindle 69 is held against the friction wheel 65 by the flat spring 72 on the disc 32. Similarly the friction disc 73 on the spindle 74 is held against the wheel 65 by the spring 76 attached to the bracket 75. The pinion 77, fixed to the other end of the spindle 74 meshes with the spur wheel 78 on a spindle pivoted in the boss 79, which conveys the motion to the flexible shaft 80 for transmission to the dial instrument. The governor is designed so that if the flywheel 59 could be tilted until its axis were at right angles to the axis of the sleeve 29, the point of contact between the friction wheel 65 and the friction disc 73 would then lie on the axis of the spindle 74 and the force exerted by the spring 64 would be reduced to zero. Under these conditions it can be shown that the effect of the governor is to cause the disc 73 to be driven at a speed inversely proportional to that of the driving disc 71. Since the disc 71 is geared to the shaft 4, its speed is proportional to V, so that the speed of the driven disc 73 is proportional to $\frac{1}{V}$.

The flexible drives 56 and 80 thus transmit to the dial instrument rotational movements one proportional to $V\dot\theta$ in amount, and the other having a rate proportional to $\frac{1}{V}$. In the following description of the dial instrument it will be shown how these two movements are utilized to obtain a movement proportional to $\dot\theta$ and thus to measure the angular deviation of the aeroplane in azimuth.

Figure 5:
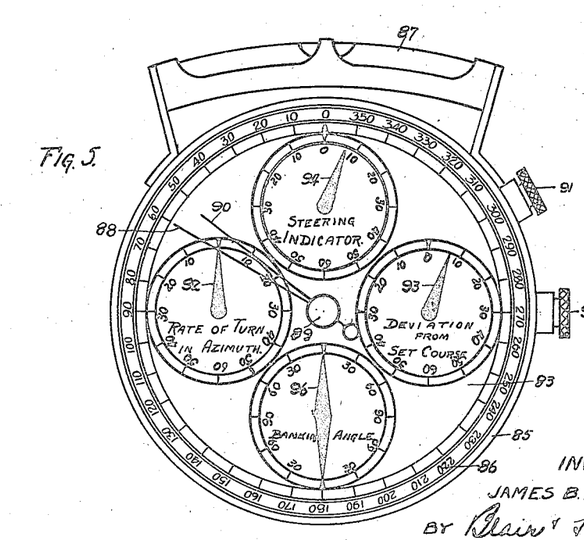
Fig. 5 is a front view of the dial instrument.
Figure 6:
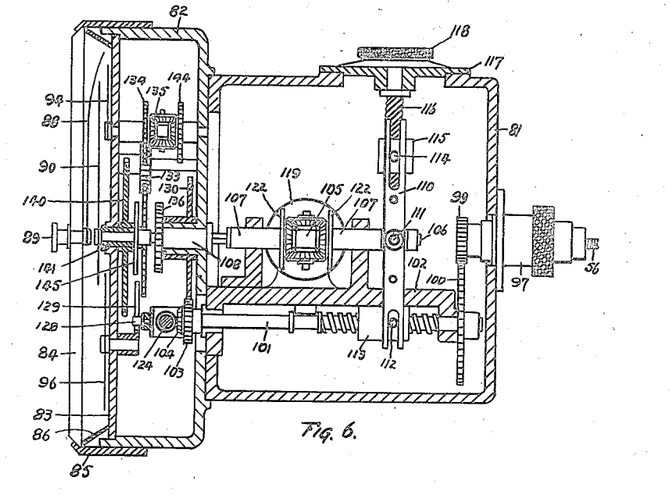
Fig. 6 is a part-sectional side elevation of the dial instrument.
Figure 7:
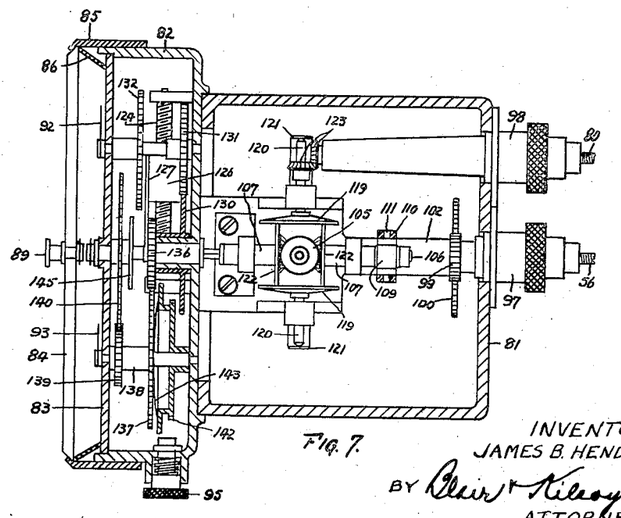
Fig. 7 is a part-sectional plan of the dial instrument. Any element shown in more than one of the figures bears the same reference number in each.

Referring to Figs. 5, 6 and 7 which illustrate the dial instrument, the body of the instrument consists of a main cylindrical casing 81 to which is fixed the cylindrical dial casing 82. The dial plate 83, fixed to the casing 82, has a cover glass 84 held in position by the ring 85 and the bezel 86. The bubble-tube 87, required to indicate when the plane is properly banked, may either be fixed to the dial casing 82, as shown in Fig. 5, or may be a separate instrument fixed to the aeroplane. The pointer 88 can be moved by hand over a scale graduated in degrees from 0 to 360 by turning the knob 89 in the centre of the cover-glass 84 and is set to indicate the compass bearing of the course which it is desired to follow. The pointer 90 moves over the same scale as the pointer 88 and indicates the course actually being followed provided it is initially properly set. By pressing and turning the knob 91 this pointer is set to agreement with the magnetic compass at any moment when the reading of the latter can be relied on, its setting being checked in the same way from time to time as required. Pointers 92, 93, 94 move over scales graduated in degrees from 0 to 60 in either direction from a central zero, the angular movement of pointer 93 for any given deviation being three times that of the pointer 90. Pointer 92 indicates rate of turning in azimuth and not rate of turning about the virtual vertical as do other gyroscopic turn indicators. Strictly speaking its movement is proportional to $V\dot\theta$ so that it is only proportional to $\dot\theta$ so long as V is constant. For practical purposes, however, fluctuations of the pointer due to changes in the value of V will be small and can be disregarded, the movement of the pointer being taken as simply proportional to $\dot\theta$ irrespective of speed. If, however, it is desired to have equal accuracy of indication over several ranges of speed, several scales can be engraved on the dial, each representing a scale of values at $\dot\theta$ at a particular value of V. Where only one scale is used, it should preferably be engraved in values of $\dot\theta$ the average cruising speed of the craft although it may be graduated for any other particular speed desired. Pointer 93 indicates deviation from the set course and although this is already indicated by the angle between the pointers 88 and 90, it provides a magnified angular movement and a stationary zero and is also of value for setting pointer 94. Pointer 94 is the steering indicator. Its movement is the algebraic sum of movements proportional to those of pointers 92 and 93 and represents $\theta + a\theta'$ where $a$ is a constant for the individual plane. It has already been explained that oscillation of the plane about the set course is reduce to a minimum if the rudder is manipulated in phase with the oscillation of this pointer upon a scale to be determined by experiment for an individual aeroplane or type of aeroplane. By pressing and turning the knob 95 the pointers 93 and 94 are set simultaneously by bringing pointer 93 to the zero mark at any moment when pointers 88 and 90 are in coincidence. Pointer 94 is not brought to zero necessarily by this operation but the $\theta$ component of its deviation is eliminated. Pointer 96 indicates the banking angle and the true vertical at any moment when the plane is correctly banked, i. e. when the bubble is in the centre of the bubble-tube 87. This pointer is conveniently made lozenge-shaped, moving over a scale graduated in degrees from 0 to 90 on either side of two central zero marks.

Figs. 6 and 7 show the mechanism for operating the several pointers. The flexible drive 56, by which a movement proportional to $V\theta'$ or $\tan\alpha$ is transmitted from the gyro instrument, enters the casing through the boss 97, and the flexible drive 80, by which a rate of movement proportional to $$\frac{1}{V}$$

is obtained from the gyro instrument, enters the casing through the boss 98. The casing 81 contains the integrator mechanism by means of which these two movements are combined to produce a movement proportional to $\theta$, the angular movement of the aeroplane in azimuth. This movement is then passed on to the casing 82 along with a movement proportional to $V\theta'$ or $\tan\alpha$, and the casing 82 contains the mechanism by which these two movements are caused to operate the several pointers.

Referring first to the mechanism in the casing 81, the pinion 99, fixed to a spindle pivoted in the boss 97 and direct-coupled to the flexible shaft 56, meshes with the spur wheel 100 fixed to the screw shaft 101 which is pivoted in bearings in the bracket 102 fixed to the casing 82. The rotational movement of the screw shaft 101 is thus proportional to $V\theta'$ or $\tan\alpha$ and this movement is conveyed to the pointers, as will be described later, by means of a pinion 103 and mitre 104 fixed to its other end which projects into the casing 82. A friction-disc integrator contains at its centre the planet mitres of the differential gear 105, carried by the spindle 106 which is pivoted in the sleeve bosses 107 of the other pair of mitres of the differential gear, these in turn being pivoted in bearings in the bracket 102. One end of the spindle 106 is splined in the sleeve 108 pivoted in the casing 82, and the other end carries the trunnioned loose collar 109 by means of which the whole of the differential gear 105 can be displaced axially on its bearings. This displacement is effected by means of the built-up fork 110 which is pivoted on the trunnions 111 of the collar 109. The fork 110 engages at its lower end with pins 112 fixed to the sliding nut 113 on the screw 101 and at its upper end with pins 114 fixed to the nut 115 on the screw 116. This screw is pivoted in the flanged boss 117 fixed to the casing 81 and has fixed to it the milled head 118 by means of which the position of the pins 114 can be adjusted and the movement of the differential gear 105 for a given movement of the screw 101 can be regulated. Friction discs 119 fixed to spindles 120 pivoted in the bracket 102 on the same axis are pressed by the springs 121 against the friction discs 122 fixed to the sleeves 107 and one of the spindles 120 is driven by the flexible shaft 80 by means of the mitres 123, at a speed inversely proportional to the speed of the aeroplane. It will be readily seen that by means of this differential friction drive the spindle 106 is driven at a speed proportional to the product of the displacement of the differential gear from its central position and the speed of the flexible drive 80, i. e. proportional to $$V\theta' \times \frac{1}{V},$$

or proportional to $\theta'$. Actual movement of the output spindle 106 will therefore be proportional to $\theta$, and by properly adjusting the position of the fulcrum 114 by means of the milled head 118 it can be made equal to $\theta$ multiplied by any desired constant. Thus the rotational movement of the spindle 106 may be used to actuate a pointer indicating the actual turning movement of the aeroplane in azimuth.

Referring now to the mechanism in the casing 82 for actuating the pointers, the application of the movement proportional to $V\theta$ or $\tan\alpha$ obtained from the screw shaft 101 will first be followed out. In order to indicate the banking angle $\alpha$ by means of the pointer 96, a tangent mechanism is required. For this purpose the pointer 96 is fitted with a slotted crank 129 engaging with a pin 128 which is moved parallel to the axis of the shaft 124 by a link 127 connecting it to a nut 126 threaded on the screwed shaft 124 which is turned by the shaft 101 through the mitres 104. The offset of the pin 128 from the axis of the pointer 96 is such as to make the angular displacement of the pointer 96 equal to the banking angle $\alpha$. The movement of the shaft 101 must also be conveyed to the Turn Indicator pointer 92 and to the Steering Pointer 94, to the latter of which it contributes a component motion. For this purpose the pinion 103 fixed to the shaft 101 meshes with the idler 130 pivoted on a boss on the casing 82 coaxial with the spindle 106. The idler also meshes with the spur wheel 131 fixed to the spindle of the pointer 92. The spur wheel 132, also fixed to the spindle of the pointer 92, meshes through the idler 133 with the spur wheel 134 fixed to a loose sleeve on the spindle of the pointer 94, this sleeve also carrying one of the input mitres of the differential gear 135, the planet mitres of which are carried by the spindle of the pointer 94.

Turning now to the motion of the spindle 106, this has to be conveyed to pointers 90, 93 and 94. For this purpose the pinion 136, fixed to the sleeve 108, meshes with the spur wheel 137 fixed to the loose sleeve 138 on the spindle of the pointer 93, and the pinion 139, fixed to the sleeve 138, meshes with the spur wheel 140 on the sleeve 141, pivoted in the centre of the dial plate 83 and carrying frictionally the spindle of the pointer 90. The spur wheel 142, fixed to the spindle of the pointer 93, is held frictionally to the spur wheel 137 by the spring 143 and meshes through an idler (not shown) with the spur wheel 144 fixed to a sleeve on the spindle of the pointer 94 carrying the other input mitre of the differential 135. Thus the movement of the pointer 94 represents the algebraic sum of two components proportional to the movements of the spindles 101 and 106. The spring knob 95, when pressed, engages frictionally with a smooth rim on the spur wheel 142, so that by pushing in this knob and turning it the pointer 93 can be set to zero and the deviation component of the pointer 94 eliminated simultaneously. Similarly the spring knob 91, when pressed, engages frictionally with the disc 145 fixed to the spindle of the pointer 90, so that by turning this knob the pointer 90 can be set into agreement with the magnetic compass, as required.

Figure 8:
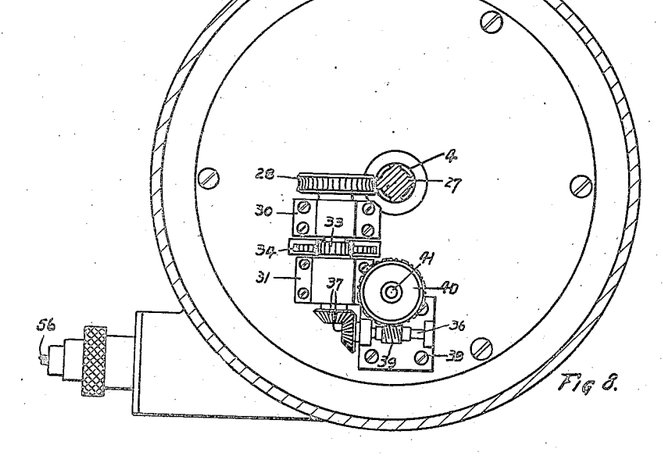
Figs. 8 and 9 show two alternative constructions which are referred to hereinafter.
Figure 9:
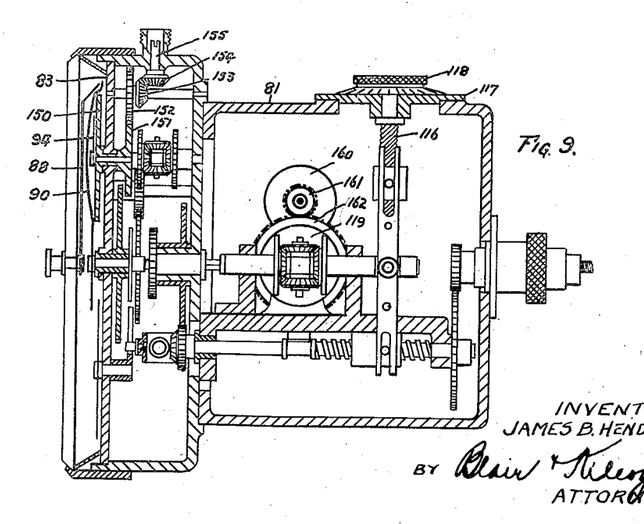

I have referred to an alternative arrangement in which a constant-speed drive may be used for the integration of $\dot\theta$ instead of the variable-speed drive from the gyro instrument. This alternative arrangement is shown in Figs. 8 and 9, Fig. 8 showing the altered form of the mechanism of Fig. 3, and Fig. 9 the necessary alterations of that of Fig. 6. In Fig. 8 the flexible shaft 80 and its governor-controlled variable-speed drive are completely eliminated and all of Fig. 3 that remains is the necessary gearing to convey the drive from the main shaft 4 to the spindle 41 to which the friction bevel 42 of Fig. 1 is attached. This gearing consists of the worm 27 on shaft 4, the wormwheel 28 and pinion 33 carried by the bracket 30, the large pinion 34 and mitre 37 carried by the bracket 31, the other mitre 37 and worm 39 carried by the bracket 38, and the wormwheel 40 attached to the spindle 41. This elimination of parts is the only alteration required in the gyro instrument. In the dial instrument the corresponding alterations may take the form of attaching the flexible shaft 80 (Fig. 7) to a separate slow-running motor or clockwork so as to convey a regular motion to the friction discs 119. Alternatively this motor or clockwork could be attached to the case 81 in place of the boss 98. It is preferable, however, to have the motor geared down to the friction disc 119, as shown in Fig. 9, where the motor 160 is let into the side of the case 81 and its spindle is geared to the adjacent disc 119 by the small pinion 161 on the motor spindle and the large pinion 162 on the shaft 120 (Fig. 7) of the disc. If required further gearing may be interposed to reduce the speed of the disc relatively to that of the motor 160. With any constant-speed drive an adjustment for the airspeed of the aeroplane must be applied, for which purpose the screw 116 is convenient, a scale of speeds being engraved on the milled head 118 and an index of the flange 117.

Fig. 9 also illustrates a desirable mechanism which was omitted from Fig. 6 in the interest of clarity in respect to that figure. In Fig. 6 the movement of pointer 94 is proportional to $\theta + a\dot\theta$ and in order to steer a straight course the movement of the steering gear must be proportional to this indication. In order, therefore, that the pilot may know how much helm he is applying or has to apply it is necessary to supply some follower mechanism for the pointer 94, this follower mechanism to be operated by the steering gear. For this purpose, instead of mounting the dial of the pointer 94 directly on the face-plate 83, I mount it as shown in Fig. 9 on a disc 150 which is pivoted by a hollow spindle in the face-plate 83 concentrically with pointer 94, the latter being carried on a spindle pivoted in the hollow spindle of the dial. At its other end this hollow spindle carries a toothed pinion 151 which meshes with a pinion 152 on the same shaft as a mitre 153, while the latter gears with a second mitre 154 on a shaft 155 pivoted in the outer case. This shaft 155 is coupled in the most convenient way, as by a flexible shaft and if necessary through gearing, to the steering gear of the craft so that by moving his steering gear in such a way as to keep the zero mark of the dial engraved on the disc 150 in line with the pointer 94 the pilot will actually be applying helm in proportion to $\theta + a\dot\theta$. Alternatively the dial could remain engraved in the face-plate 83 and a second pointer could be substituted for the disc 150, the pilot's task then being to keep the two pointer in line. In either arrangement the ratio of the gearing between the steering gear and the dial 150 or second pointer, which may be either external gearing or the gearing 151, 152, 153, 154, is a matter for experiment with the individual type of aeroplane, as some need less helm than others for a given rate of turning. In fact the gearing might be made variable to suit the conditions of flight, so as to provide slow, easy steering for solo flights and quicker, closer steering for formation flying.

Although I have described the instrument as being fixed to the plane, I may alternatively pivot the casings of both the gyro instrument and the dial instrument upon spindles, pendular fashion, the spindles being parallel to the axis of the cylinders, so that the cases may swing into the virtual vertical plane. This arrangement is preferable on board ships where the deck of the ship does not follow the virtual vertical when turning under helm. In such cases the flexible shafts would naturally be connected through the pivoting spindles or be coaxial therewith. This pendular suspension of the gyro instrument is necessary because the measurements of $\theta$ and $\dot\theta$ are derived from measurement of $\omega$, the angular velocity about the virtual vertical, and in order to measure the latter the instrument must be allowed to seek the virtual vertical. Similarly in the case of the dial instrument the pointer 96, although it would in any case be displaced relatively to its dial through the angle of displacement of the virtual vertical, will not actually point vertically unless the dial itself is free to swing its zero diameter into the virtual vertical plane indicated by the bubble-tube. When the instrument is used on board ship an air-speed drive of the gyro is unsuitable as the speed V is not the air-speed but the speed of the ship through the water. This is most easily accomplished by connecting the gyro spindle 4 (Fig. 1) to an electric motor, either by a flexible drive or direct-coupled by the member 5, the motor being of the variable-speed type with a suitable control to vary the speed of rotation in proportion to ship's speed.

I have described the instrument as of the turn indicator type and have described it as applied to the indication of turning movements in azimuth, but it will be obvious to those skilled in the art that it may equally well be applied to measurement of angular movements in any plane fixed relatively to the earth, such as pitching motion in the longitudinal vertical plane of the craft or rolling motion in the transverse plane. For the former the only alteration required is to turn the gyro instrument round its axis through 90° so as to place the gyro trunnions vertical, while in the latter case it would have to be turned so as to bring the rotor axis into the plane of roll and the trunnions at right angles thereto. In the latter case also a different type of propellor would have to be used as it would be disposed sideways to the wind, or else an airscrew of ordinary type could be used coupled to the driving shaft 4 through bevels or a flexible drive.

I claim:—

1. A turn indicator comprising a gyroscope sensitive to turning of the craft about an axis which banks when the craft turns in azimuth and driven at a speed proportional to the speed of the craft, movable torque-applying means for constraining the gyroscope to occupy a fixed position relatively to said axis when the craft turns, motive means controlled by the gyroscope for actuating said torque-applying means and having movement in proportion to the tangent of the banking angle of said axis, a governor-controlled variable-speed gear driven by the gyroscope, a shaft driven by said gear at a speed controlled by the governor and inversely proportional to the speed of the craft, an integrator having a part connected to said shaft for movement at a speed inversely proportional to the speed of the craft and a second part having movement in proportion to and controlled by said motive means, and a third part actuated jointly by said first and second parts in proportion to the angular displacement of the craft in azimuth.

2. A turn indicator for aircraft comprising a gyroscope sensitive to turning of the craft about a normally vertical axis fixed relatively to the craft, means for driving the gyroscope at a speed proportional to the linear speed of the craft, movable torque-applying means constraining the gyroscope to the craft and having movement relatively to the gyroscope proportional to the product of the linear speed of the craft and its angular velocity in azimuth, an integrator comprising a part having movement at a constant speed, a second part driven by said first part and actuated partly by and in accordance with the movement of said torque-applying means and partly in accordance with the reciprocal of the linear speed of the craft, and a third part having movement due to cooperation of said first and second parts in proportion to the angular displacement of the craft in azimuth.

3. A turn indicator for aircraft comprising a gyroscope driven at a speed proportional to the airspeed of the craft and sensitive to turning of the craft about a normally vertical axis which banks when the craft turns in azimuth, a member driven at a speed proportional to the airspeed of the craft, a governor driven by said member, a second member driven by said first member at a speed controlled by said governor and inversely proportional to the air speed of the craft, movable means associated with the gyroscope and controlled thereby, having movement in proportion to the product of the airspeed of the craft and the angular velocity of the craft in azimuth, and an integrator controlled partly by said movable means and partly by said second member for measuring the angular displacement of the craft in azimuth during a turn.

4. In a turn indicator for aircraft, in combination, a gimbal member supported on the craft on a normally horizontal trunnion axis, a gyroscope driven at a speed proportional to the airspeed of the craft and pivoted by its rotor axis in said gimbal member so as to be sensitive to turning of the craft about a normally vertical axis at right angles to said rotor and trunnion axes, a power mechanism controlled by the gyroscope in one direction or the other according to the direction of turning of the craft, springs normally lying in the plane of said gimbal member and connecting said power mechanism and gimbal member to oppose tilting of the gimbal member when the craft turns, and means to adjust the tension of said springs so that when the craft is correctly banked during a turn the displacement of the mechanism required to prevent the gimbal member from tilting displaces the springs relatively to the plane of the gimbal member by an amount proportional to the banking angle of the craft.

5. In a turn indicator for aircraft, a gyroscope driven at a speed proportional to the linear speed of the craft and sensitive to turning of the craft, a member angularly displaceable relatively to the gyroscope, torque-applying means connecting said member to the gyroscope to apply torques thereto in proportion to the sine of the angular movement of said member, said torque-applying means being adjusted so that the movement of the member required to keep the gyroscope fixed relatively to the craft during a turn is proportional to the deflection of the virtual vertical due to said turn, a vertical indicator having movement in accordance with movement of said member to indicate the deflection of the virtual vertical and in the opposite direction, means controlled by the gyroscope upon movement thereof for moving said member and indicator, whereby upon banking the craft during a turn the indicator indicates the true vertical.

6. In a turn indicator for aircraft, a gyroscope sensitive to turning of the craft about an axis which banks with the craft during a turn of the craft in azimuth, torque-applying means movable relatively to the gyroscope and so adjusted that when moved through a distance proportional to the tangent of the banking angle of said axis the gyroscope is kept in a fixed position relatively to the craft during a turn, said tangent being proportional to the product of the linear speed of the craft and its angular velocity in azimuth, an indicator to indicate said product, a dial bearing a scale appropriate to the speed of the craft to indicate in conjunction with said indicator the angular velocity of the craft in azimuth, motive means controlled by the gyroscope for moving said torque-applying means and said indicator in accordance with said product, an integrator actuated partly by a member driven by said motive means and moving in proportion to said product and partly by a member having movement in proportion to said linear speed, means for combining the two movements, and an indicator actuated by the resultant of said movements to indicate the angular displacement of the craft during a turn.

7. In a turn indicator for use on a craft, a gyroscope sensitive to turning of the craft about a normally vertical axis which banks when the craft turns in azimuth, said gyroscope being driven at a speed proportional to the linear speed of the craft, torque-applying means movable relatively to the gyroscope and controlled thereby for maintaining the gyroscope in a substantially fixed position relatively to said axis during a turn, said means being adjusted so as to have movement in proportion to the product of the linear speed of the craft and its angular velocity in azimuth, an integrator comprising a member moving in proportion to said product, a second member having movement in accordance with a function of said linear speed, and a third member driven by said first and second members in accordance with the angular displacement of the craft in azimuth during a turn, an indicator having movement in proportion to the sum of the movements of said torque-applying means and said third member, and a follow-up for said indicator, said follow-up being actuated by the steering gear of the craft.

8. A turn indicator for use on a craft comprising a gyroscope rotating at a speed proportional to the speed of the craft and movably mounted so as to be sensitive to the rate of turning of the craft about an axis which seeks the virtual vertical when the craft turns in azimuth, angularly movable constraining means connected to the gyroscope for applying thereto torques opposing movement of the gyroscope away from a central position in proportion to the sine of the angle of movement of said constraining means, means to adjust the strength of said constraining means so that their angle of movement required to keep the gyroscope in a fixed position relatively to said axis during a turn of the craft is equal to the banking angle of said axis due to said turn, and means responsive to precession of the gyroscope for moving said constraining means during a turn of the craft so as to maintain the gyroscope in said relatively fixed position whereby the angular movement of said constraining means is equal to the banking angle of said axis due to said turn.

9. A turn indicator for use on a craft comprising a gyroscope rotating at a speed proportional to the speed of the craft and movably mounted so as to be sensitive to the rate of turning of the craft about a normally vertical axis which banks to the virtual vertical when the craft turns in azimuth, angularly movable constraining means connected to the gyroscope for applying torques thereto opposing said movement in proportion to the sine of the angle of movement of said constraining means, means to adjust the strength of said constraining means so that their angle of movement required to keep the gyroscope in a substantially fixed position relatively to said axis during a turn of the craft is equal to the banking angle of said axis due to said turn, a normally vertical pointer operatively connected to said constraining means for movement through the same angle, a scale adjacent said pointer and fixed relatively to said axis, and motive means responsive to precession of the gyroscope for moving said constraining means and said pointer, the movement of the constraining means being in the direction to keep the gyroscope in said relatively fixed position and the movement of the pointer being in the direction opposite to that of said axis so as to indicate on said scale the direction of the true vertical in the plane of movement of said axis.

10. A turn indicator for use on a craft comprising a gyroscope mounted so as to be sensitive to the rate of turning of the craft about an axis which banks when the craft turns in azimuth and means to determine the component rate of turning of the craft about the normal position of said axis, said means comprising means to rotate the gyroscope at a speed proportional to the speed of the craft, angularly movable constraining means for applying torques to the gyroscope in proportion to the sine of the angle of movement of said constraining means, a tangent mechanism movable in proportion to the tangent of said angle and connected to the said constraining means to angularly move the same, and motive means controlled by the gyroscope for moving said tangent mechanism and thereby said constraining means so as to keep the gyroscope in a fixed relation to said axis during a turn of the craft.

11. A turn indicator for use on a craft comprising a gyroscope mounted so as to precess upon turning of the craft about an axis which seeks the virtual vertical when the craft turns in azimuth and means to indicate the component rate of turning of the craft in azimuth when the said axis banks during a turn, said means comprising means to rotate the gyroscope at a speed proportional to the speed of the craft, angularly movable constraining means for applying torques to the gyroscope in proportion to the sine of the angle of movement of said constraining means, a tangent mechanism movable in proportion to the tangent of said angle and connected to said constraining means to angularly move the same so that the gyroscope is kept in a fixed relation to said axis during said turn, motive means responsive to precession of the gyroscope for moving said tangent mechanism and said constraining means so as to keep the gyroscope in said fixed relation to said axis, a pointer movable by said motive means in proportion to movement of said tangent mechanism, and a scale adjacent said pointer graduated in terms of the angular velocity of the craft in azimuth, said velocity being proportional to the tangent of said banking angle divided by the speed of the craft.

JAMES BLACKLOCK HENDERSON.